US005630382A

United States Patent [19]

Barbera et al.

[11] Patent Number: 5,630,382

[45] Date of Patent: May 20, 1997

[54] ILLUMINATED PET HARNESS

[76] Inventors: Annette M. Barbera, 1176 Idylewild Dr., Annapolis, Md. 21401; Charlene H. Brannon, 12722 Kembridge Dr., Bowie, Md. 20715

[21] Appl. No.: 532,229

[22] Filed: Sep. 22, 1995

[51] Int. Cl.[6] .............................................. A01K 27/00

[52] U.S. Cl. .............................................. 119/859; 362/108

[58] Field of Search .............................. 119/859; 362/108

[56] References Cited

U.S. PATENT DOCUMENTS

| | | | |
|---|---|---|---|
| 3,935,443 | 1/1976 | Simmons | 362/108 |
| 4,234,907 | 11/1980 | Daniel | 362/108 X |
| 4,652,981 | 3/1987 | Glynn | 362/108 X |

FOREIGN PATENT DOCUMENTS

| | | | |
|---|---|---|---|
| 2579417 | 10/1986 | France | 119/859 |

*Primary Examiner*—Robert P. Swiatek

[57] ABSTRACT

An illuminated pet harness comprises the use of a neck and body collar strap structure arranged for securement about an animal's neck and torso region respectively, having a connecting web extending between the neck and collar straps. If desired, alternatively only a neck collar strap may be employed by the invention as opposed to a full body harness as indicated. The straps include securement top and bottom layers secured at their side portions to define a cavity therethrough, having a fiber optic core, with the fiber optic core directed to at least one battery housing, such that at least one illumination bulb within the battery housing directs illumination onto the fiber optic core that in turn projects illumination through a plurality of lenses directed through a top layer web of each of the straps.

3 Claims, 3 Drawing Sheets

ILLUMINATED PET HARNESS

TECHNICAL FIELD

The field of invention relates to dog collar structure, and more particularly pertains to a safety illuminated pet harness arrangement wherein the same is directed to effect illumination to indicate visible orientation of a pet, particularly during conditions of limited available light.

BACKGROUND OF THE INVENTION

Prior art harness structure as understood has heretofore failed to provide for illuminated harness structure as presented by the instant invention to permit the flexible illuminated association of a light source through fiber optic structure and to this end, the instant invention is believed to advantageously define over the prior art in this respect.

SUMMARY OF THE INVENTION

The illuminated pet harness of the invention comprises the use of a neck and body collar strap structure arranged for securement about an animal's neck and torso region respectively, having a connecting web extending between the neck and collar straps. If desired, alternatively only a neck collar strap may be employed by the invention as opposed to a full body harness as indicated. The straps include securement top and bottom layers secured at their side portions to define a cavity therethrough, having a fiber optic core, with the fiber optic core directed to at least one battery housing, such that at least one illumination bulb within the battery housing directs illumination onto the fiber optic core that in turn projects illumination through a plurality of lenses directed through a top layer web of each of the straps.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The illuminated pet harness 10 of the invention comprises at least a flexible collar strap 11 having first strap fasteners

Figure 1:
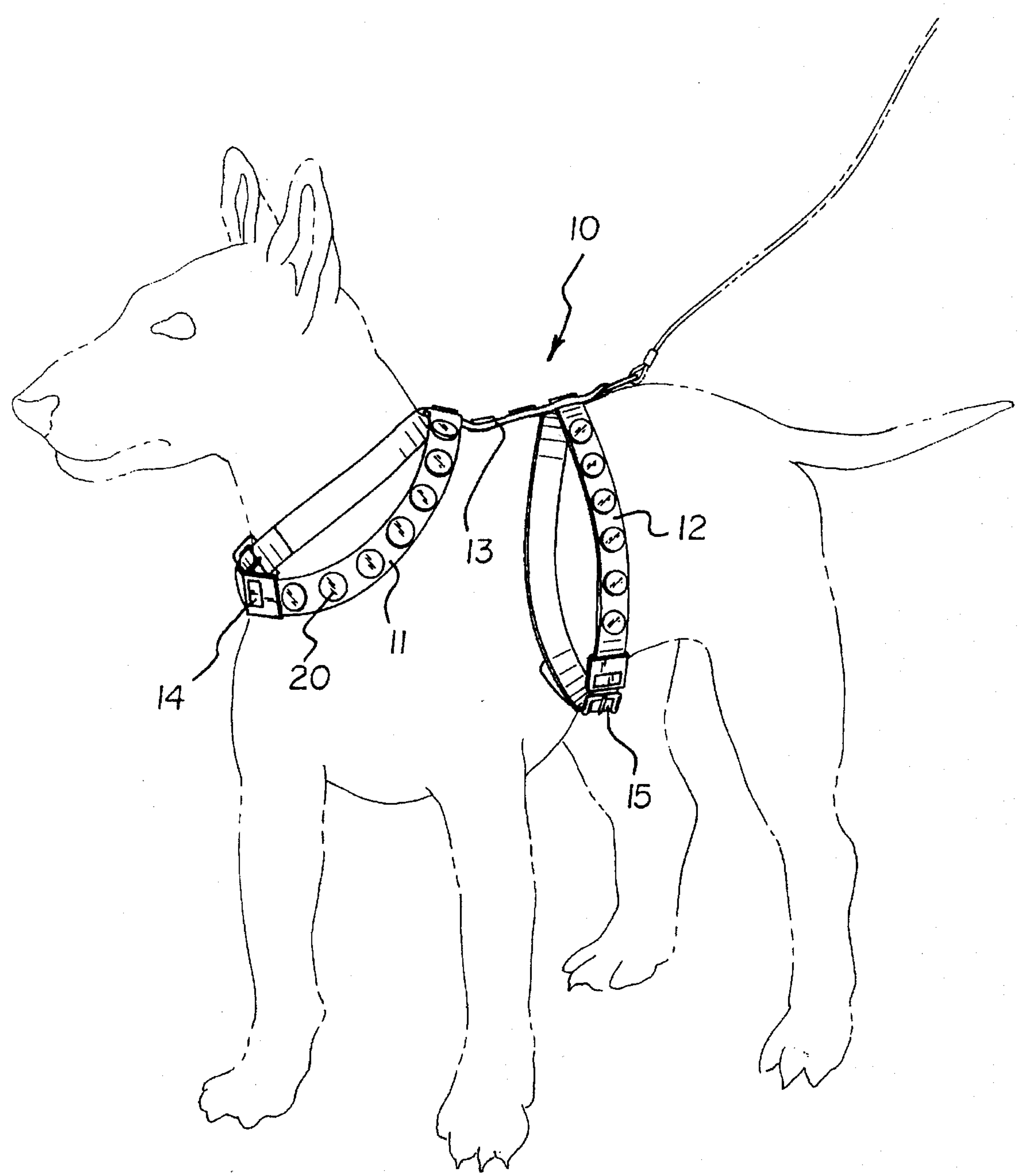
FIG. 1 is a perspective illustration of the invention in use.
Figure 2:
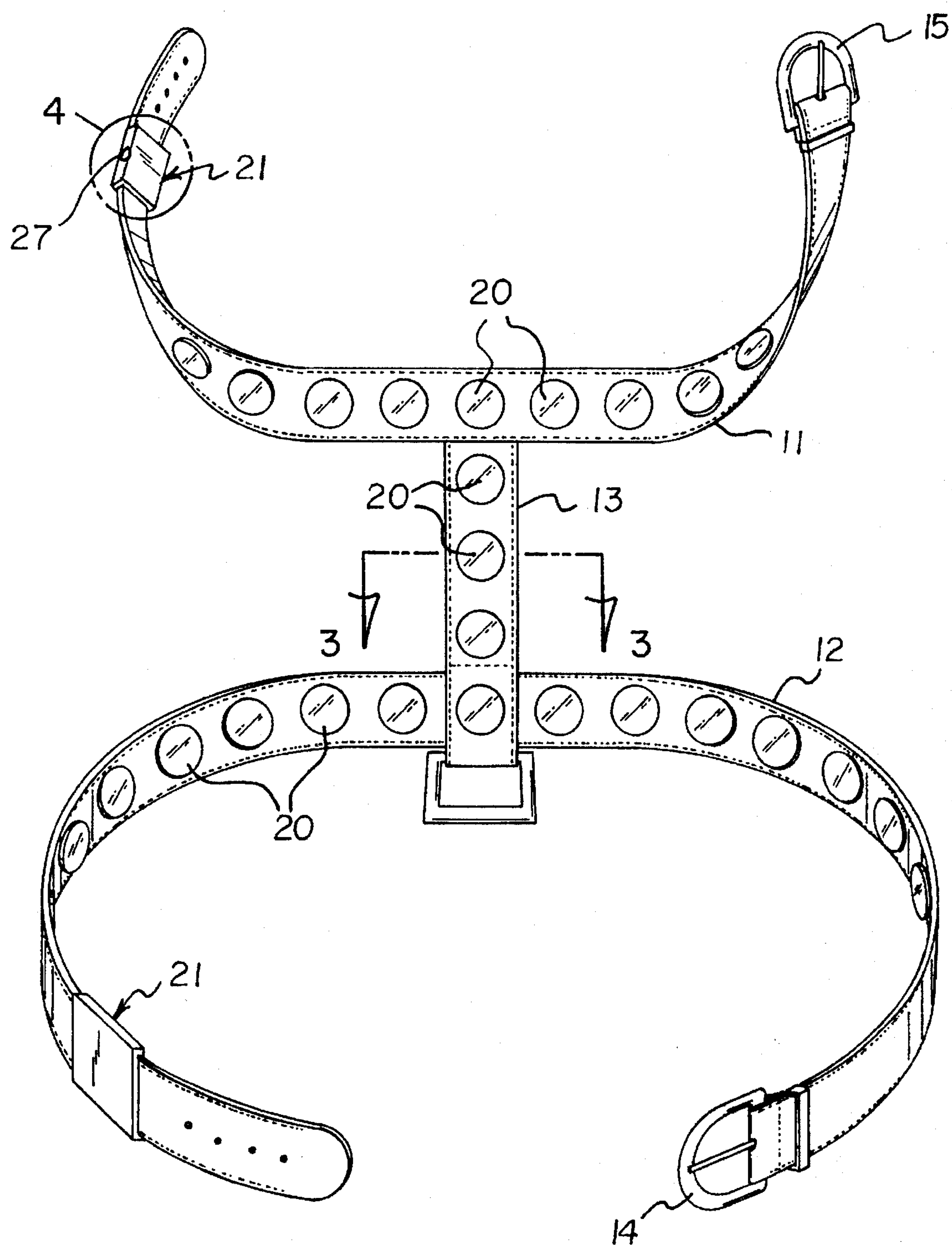
FIG. 2 is a top perspective view of the invention.

14 (see FIG. 2) to secure the free distal ends of the first strap together. A body collar strap 12 arranged for securement about an animal's torso, such as indicated in FIG. 1, has its second strap fasteners 15 secured at the free distal ends of the body collar strap 12 together about the animal's torso, such as indicated in FIG. 1. A connecting web 13 secures the neck and body straps 11 and 12 together, as indicated in the FIGS. 1 and 2.

Figure 3:
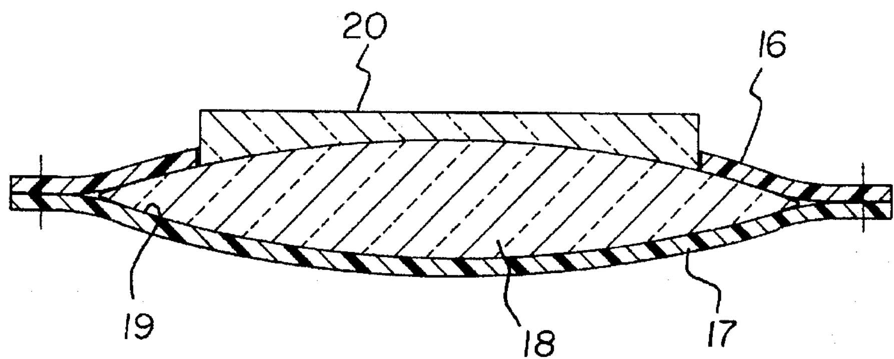
FIG. 3 is a cross-sectional view, taken along the lines 3—3 of FIG. 2 as indicated.

Each of the straps 11, 12, and 13 employs a top layer web 16 secured to a bottom layer web 17 at the peripheral edges of the top and bottom webs 16 and 17 defining a harness cavity 19 extending through each of the straps, as exemplified by the FIG. 3. Coextensively directed through the harness cavity is a fiber optic core 18 of flexible construction, with a series of lens members 20 directed through the top layer web 16 in contiguous communication with the fiber optic core, such that illumination directed through the fiber optic core 18 is in turn projected through each of the lens members 20.

Figure 4:
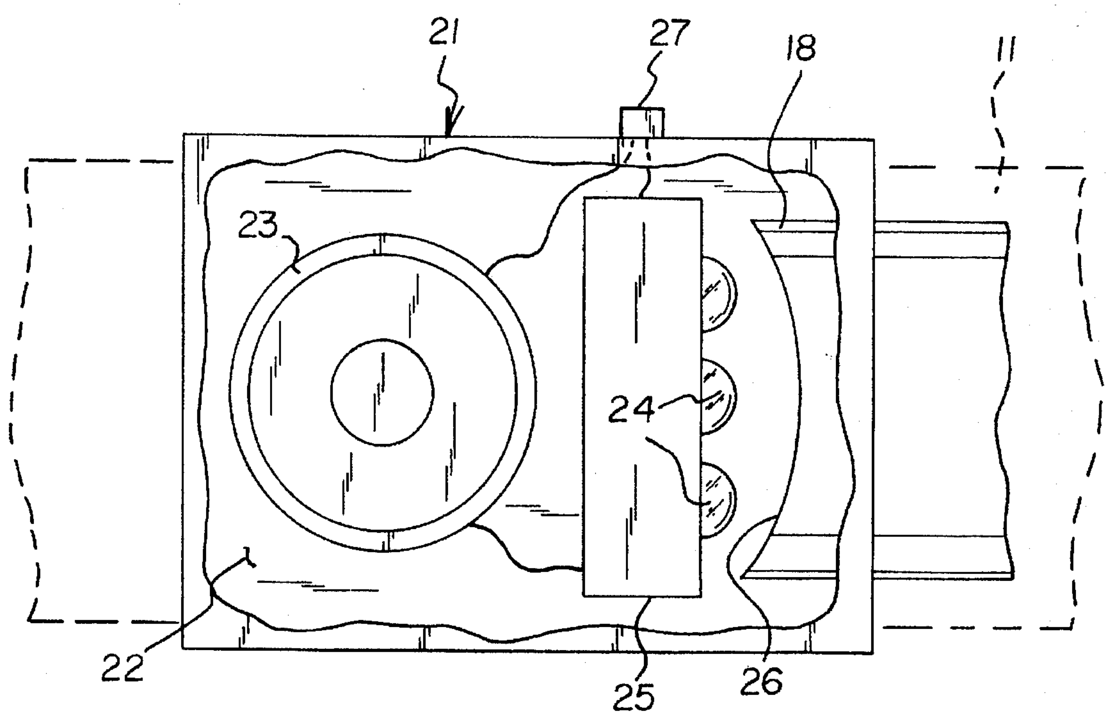
FIG. 4 is an enlarged top plan view, partially in section, of a battery housing as used by the invention.

Integral with the neck and body straps 11 and 12 are separate battery housings 21. If desired, only one such battery housing may be employed but to insure continuous and desired illumination through the fiber optic core 18, each strap includes a separate battery housing 21 of identical construction, such as indicated in FIG. 4. To this end, each battery housing 21 is defined by a housing cavity 22 having a battery 23 contained therewithin in electrical communication with at least one, and preferably a plurality of, illumination bulbs 24 through an on/off switch 27 to provide for selective electrical communication between the battery 23 and illumination bulbs 24. Such electrical communication through an on/off switch 27 is per se understood relative to a conventional DC circuit of a simplistic construction as illustrated. To this end, the fiber optic core 18 is provided with a concave fiber optic core end portion 26, such as illustrated in FIG. 4, to enhance light gathering into the fiber optic core and direct such illumination therethrough and ultimately through the lens members 20. It should be noted that the illumination bulbs 24 as indicated are mounted within a holder 25 fixedly secured within the cavity 22 to maintain alignment of the bulbs relative to the fiber optic end core portion 26.

In this manner, illumination to a pet is available to provide for ease of visual spotting and positioning of that pet to thereby provide a manner avoiding harm to the pet, such as by a motor vehicle driver and the like.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. An illuminated pet harness, comprising, a neck collar strap, the neck collar strap having neck collar strap free distal ends, with first strap fasteners arranged for selective securement of the neck collar strap free distal ends together, and illumination means directed through the neck collar strap for effecting selective illumination from the neck collar strap, wherein the illumination means includes a fiber optic core directed through the neck collar strap, and the fiber optic core having a plurality of lens members in contiguous communication with the fiber optic core, with the lens members directed through the neck collar strap.

2. A harness as set forth in claim 1 further including a body collar strap, and a connecting web connecting the neck collar strap and the body collar strap together, with the fiber optic core directed through the neck collar strap, the body collar strap, and the connecting web, and the neck collar strap, the body collar strap, and the connecting web each having a top layer web and a bottom layer web secured together to define a harness cavity directed through the neck collar strap, the body collar strap, and the connecting web and receiving the fiber optic core therethrough, and the top layer web having the lens members directed therethrough in contiguous communication with the fiber optic core.

3. A harness as set forth in claim 2 wherein the harness includes a battery housing secured thereto, and the fiber optic core having at least one fiber optic core end portion of a concave configuration extending into the battery housing, the battery housing having a battery housing cavity receiving the fiber optic core end portion, and the illumination means further including a battery and an illumination bulb in electrical communication with the battery, with the illumination bulb arranged in a facing relationship relative to the concave fiber optic core end portion within the battery housing cavity.

* * * * *